United States Patent [19]

Matsui

[11] 4,420,936

[45] Dec. 20, 1983

[54] DRIVE CONTROL CIRCUIT FOR DENTAL TREATMENT TABLE

[75] Inventor: Takahiro Matsui, Uji, Japan

[73] Assignee: Kabushiki Kaisha Morita Seisakusho, Kyoto, Japan

[21] Appl. No.: 249,385

[22] Filed: Mar. 31, 1981

[30] Foreign Application Priority Data

Jun. 18, 1980 [JP] Japan ............................ 55-85339[U]

[51] Int. Cl.³ ............................................ F16D 31/02

[52] U.S. Cl. ........................................ 60/431; 60/434

[58] Field of Search ......................... 60/431, 433, 434

[56] References Cited

U.S. PATENT DOCUMENTS 3,124,371 3/1964 Weir ................................. 60/433 X
3,310,942 3/1967 Stanford ............................... 60/431
3,910,045 10/1975 Herrmann ............................ 60/433

*Primary Examiner*—Arnold Rosenthal
*Attorney, Agent, or Firm*—Koda and Androlia

[57] ABSTRACT

A drive control circuit for a dental treatment table with a hydraulic cylinder for elevating and lowering a seat comprising a hydraulic drive circuit equipped with a hydraulic pump, a first hydraulic valve for elevating said cylinder, and a second hydraulic valve for lowering said cylinder, and a hydraulic pump operation circuit equipped with an air switch, a first air valve for controlling said air switch and said hydraulic valve for elevating said cylinder, and a second valve for controlling said hydraulic valve for lowering said cylinder. The drive control circuit may further comprise a second cylinder for tilting a backrest which can be controlled by the hydraulic drive circuit and the hydraulic pump operation circuit.

6 Claims, 5 Drawing Figures

DRIVE CONTROL CIRCUIT FOR DENTAL TREATMENT TABLE

BACKGROUND

1. Field of the Invention

The present invention relates to drive control circuits for the on-off control of the hydraulic drive for elevating and lowering the seat of a dental treatment table, as well as the forward and backward tilting of a backrest of the dental treatment table by means of a pneumatic type pressure control valve.

2. Prior Art

As is known in the prior art, the vertical movement of a seat and the forward and backward tilting of the backrest can be provided by supplying or withdrawing oil pressure through a hydraulic drive circuit to and from hydraulic cylinders. However, in a conventional type, many electrical parts are utilized. For example, a relay switch is used in the hydraulic pump operation circuit and a solenoid is used in the hydraulic drive circuit. Furthermore, such circuits operate on a low voltage which is stepped down by a transformer. Consequently, in view of the power consumption, burning out of the transformer by continuous use, etc., there has been a long felt need for finding a substitute for electric controllers.

SUMMARY OF THE INVENTION

Accordingly, it is a general object of the present invention to provide a pneumatic control means to control the hydraulic control circuit for vertically moving the seat of the dental treatment table and tilting the backrest thereof.

The above-mentioned features and objects of the present invention are accomplished by a unique control circuit wherein the electrical components are replaced by pneumatically operated control valves which are operated by air pressure which is preferably air pressure supplied from the compressed air pipe line for operating the dental handpiece.

BRIEF DESCRIPTION OF THE DRAWINGS

The above-mentioned features and objects of the present invention will become more apparent with reference to the following description taken in conjunction with the accompanying drawings, wherein like reference numerals denote like elements and in which.

DETAILED DESCRIPTION OF THE INVENTION

Figure 1:
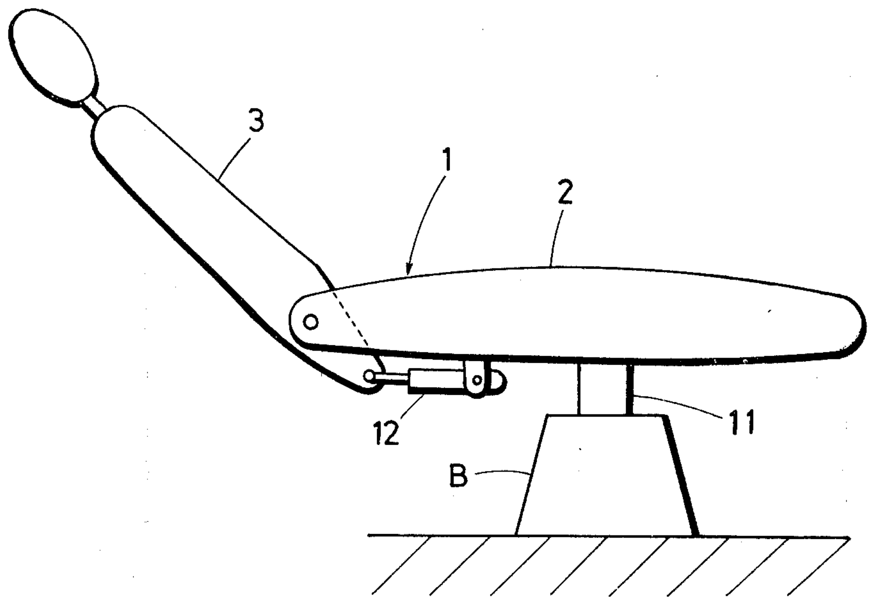
FIG. 1 is a side view of a dental treatment table provided with the drive control circuit of the present invention.

Referring more particularly to the drawings, in FIG. 1 is shown a dental treatment table wherein not only the vertical movement of the seat but also the tilting of the backrest is operated by oil pressure. In FIG. 1, the dental treatment chair 1 and its seat 2 are moved up and down by a hydraulic cylinder that is driven and controlled by a circuit in accordance with the teachings of the present invention and such circuit is provided in the base B. The backrest 3 is tilted backward and forward by means of a hydraulic cylinder 12.

Figure 2:
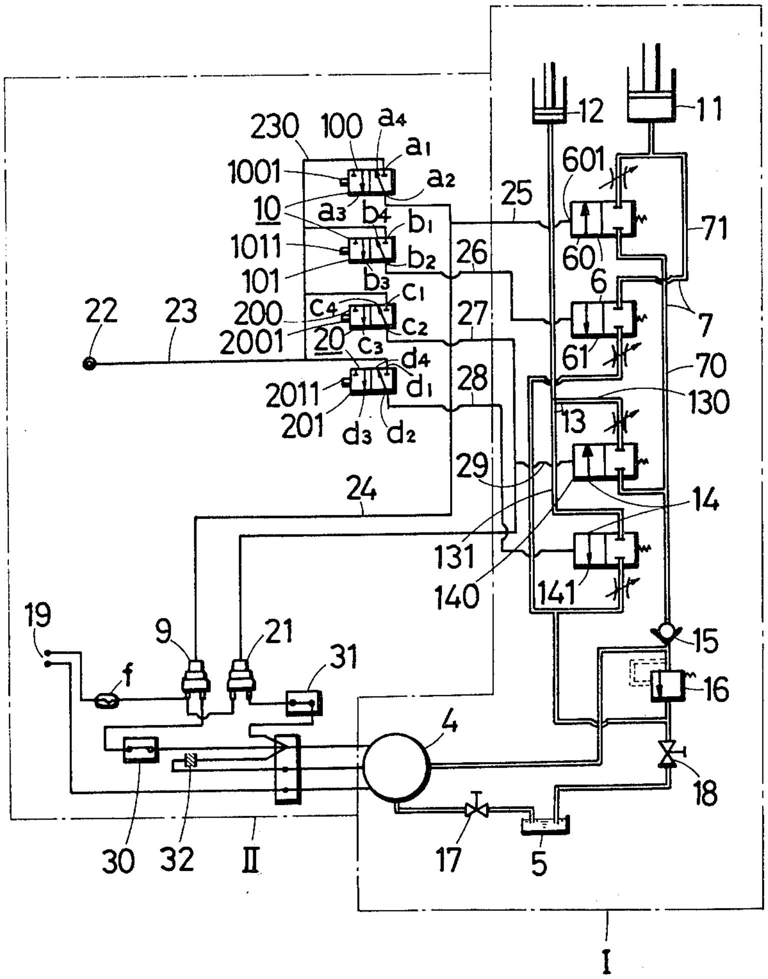
FIG. 2 is an overall view of the circuit of the present invention.

In FIG. 2, the hydraulic drive circuit I is composed of an oil tank 5, hydraulic pump 4, hydraulic pipelines 7 and 13 and pneumatic type oil pressure regulating valves (hereinafter referred to as hydraulic valves) 6 and 14 provided in the pipelines 7 and 13. In particular, the pipeline 7 is divided into outgoing pipeline 70 and returning pipeline 71 and in each of the pipelines 70 and 71, hydraulic valves 60 and 61 are installed respectively.

Likewise, pipeline 13 is divided into outgoing pipeline 30 and returning pipeline 131 and each of the pipelines 130 and 131 has a pair of hydraulic valves 140 and 141 provided therein respectively. In the FIG. 2, all of the hydraulic valves 60, 61, 140 and 141 are shown in the non-operating or OFF state. Furthermore, in FIG. 2 the circuit includes a check valve 15, relief valve 16 and oil feed valves 17 and 18. Also the circuit includes hydraulic pump operation circuit II which is provided with a hydraulic pump 4, power source 19 and air switches 9 and 21 provided between both electric circuits and which are operated by the air valve 10 for lifting and lowering the seat as well as the air valve 20 for forward and backward tilting of the backrest. The air switches 9 and 21 also function as the on-off control of the pump control 4 as to the power source 19. In addition, the air valve 10 is divided into a section for lifting 100 and for lowering 101 and the air valve 20 is divided into a section for forward tilting 200 and for backward tilting 201. The air valve sections 100, 101, 200 and 201 have the same structure. With regard to their relationship to the air supply pipeline connected to the air source 22, the air valves 100, 101, 200 and 201 are provided with three ports, $a_1$, $a_2$, and $a_3$. In the following description only one air valve section 100 is described since the remainder of the air valve sections 101, 200 and 201 are the same and are similarly marked in the drawings. Of these ports the port $a_1$ is closed when the valve section 100 is at a non-operating position and is connected to the branch pipeline 230 of the air supply pipeline 23. The port $a_2$ is connected to the air switch 9 by a pipeline 24 while the branch pipeline 25 from the pipeline 24 is connected to the compressed air inlet port 601 of the hydraulic control valve 60. The other port $a_3$ of the air valve section 100 is designed to open the passage between the pipeline 24 and the branch pipeline 230 when the air valve section 100 is actuated (when the knob 1001 is pushed to the right side in the figure and set at a position in line with the air supply pipeline 230).

The air valve 100 is further provided with another air outlet port $a_4$ for communicating with the atmosphere during the non-operating state. The air valves 101 and 201 are connected only to the hydraulic valve 61 and 141 without being connected to the air switch. In the same manner as in air valve section 100, the air valve section 200 is connected to the other air switch 21.

The air circuit of the hydraulic pump 4 shown in FIG. 2 is further provided with a fuse f, a limit switch 34 for turning off the circuit when the hydraulic cylinder 11 reaches either the top or bottom dead point, another limit switch 31 which functions similarly to limit switch 30, hydraulic cylinder 12 and ground 32.

Figure 3:
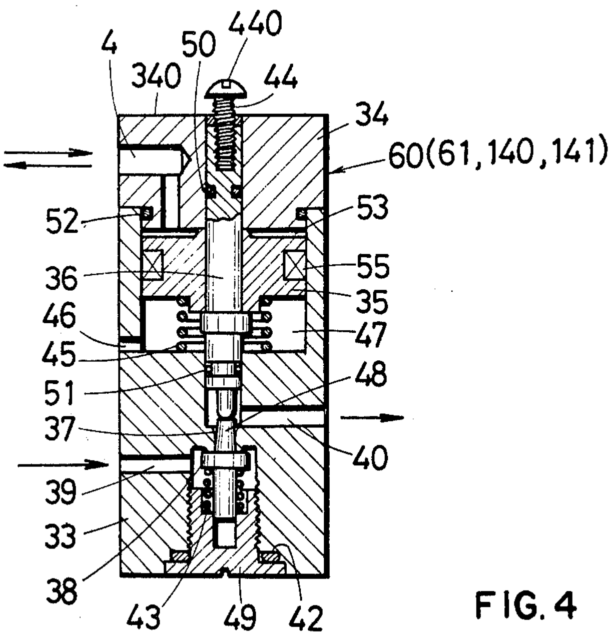
FIG. 3 is a sectional view of a pneumatically operated hydraulic control valve utilized in the circuit of FIG. 2 showing the valve in the closed state.
Figure 4:
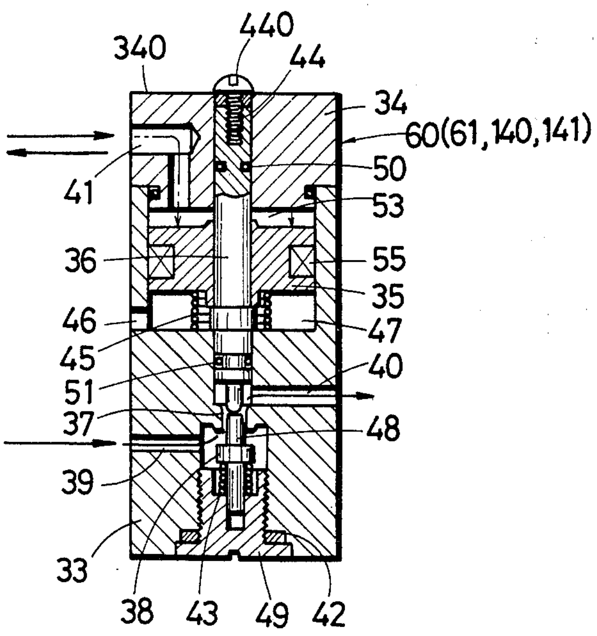
FIG. 4 is a figure similar to FIG. 3, except the control valve is shown in the open state.
Figure 5:
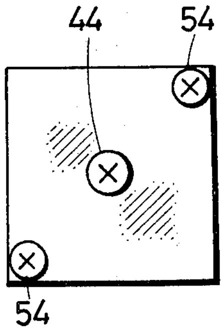
FIG. 5 is a top plan view of the control valve of FIGS. 3 and 4.

The structure of the hydraulic valves 60, 61, 140 and 141 is shown in FIGS. 3 and 4, and each is totally identical. However, the valves are divided into hydraulic valves 60 and 140 for feeding oil in the upward direction and hydraulic valves 61 and 141 for feeding oil in the downward direction.

Each of the valves 60, 61, 140 and 141 is composed of a valve body 33, cover body 34 fixed to the valve body 33, piston 35 provided between the valve 33 and cover body 34, valve rod 36 fixed to the piston 35, valve rod 48, valve stopper 38 fixed to the valve rod 36 and which serves to optionally open and close the valve port 37 provided in the valve body 33, oil inlet port 39 and oil outlet port 40 are provided in the valve body 33 and communicate with valve port 37, an air inlet port 41 provided in the cover 34 for letting compressed air work on the piston 35, a spring 45 to constantly press the piston 35 with an elastic force in a direction opposite to the operating direction of the compressed air and an adjuster 44 to control the upward and downward stroke of the valve rod 36.

In operation, the hydraulic valve functions such that when compressed air is absent the oil inlet port 39 and the oil outlet port 40 are blocked by closing the valve port 37 with the valve stopper 38 by means of the spring 45. However, when compressed air is introduced from air inlet port 41, the piston 35 is caused to move in a direction to open the valve port 37 against the elastic force of the spring 45 to thus open the passage between the oil inlet port 39 and the oil outlet port 40.

In the above hydraulic control valve, the valve rod 36 is provided with another valve rod 48 in a manner so as to substantially and coaxially abutt against the valve rod 36 and the valve rod 48 is provided with the valve stopper 38. The valve rod 48 is further provided with another spring 43 which constantly biases the valve stopper 38 in a direction to close the valve port 37 in cooperation with the spring 45. However, it should be apparent that if the valve rods 36 and 48 are provided as a single unit and the valve closing force as well as the rebounding force of the valve stopper 38 can be sufficiently provided by the single spring 45, it is not necessary to divide it into two rods as shown in the drawings.

The oil quantity adjuster 44 consists of a screw screwed into the top part of the valve rod 36 and which is capable of engaging with the top 340 of the cover 34 through the head 440 of the screw 40. The oil quantity adjuster 44 is designed such that when the screw 44 is tightened, the distance between the screw head 440 and the top part 340 is shortened causing the stroke of the valve rod 48 to be short with the result that the opening between the valve stopper 38 and the valve port 37 is reduced and only a small amount of oil passes therethrough. Conversely, when the screw 44 is loosened, the opening of the valve port 37 is widened and a large amount of oil passes therethrough. A stopper 49 is screwed into the bottom part of the valve body 33 and controls the spring force applied by the spring 43 to the valve rod 48. Furthermore, the hydraulic valve is provided with an O-ring 51 for sealing the compressed air side of the hydraulic side, a second O-ring 50 for sealing the compressed air side on the atmospheric side and a third O-ring 52 for sealing the compressed air side and the atmospheric side. The third O-ring 52 is provided at the joint between the cover 34 and the valve body 33. In addition, a packing 55 is provided for the piston 35 and a screw 54 is provided for connecting the cover 34 with the valve body 33. In addition, the hydraulic valve is provided with piston chamber 47, air vent 46 for maintaining the chamber 21 at atmospheric pressure and a pocket 53 provided on the upper surface of the piston 35. The above described pneumatic control valve is substantially the same as the one described in Japanese Utility Model Patent Application 1980-85337, which has been filed separately by Applicant.

It should be apparent that utilizing a hydraulic control valve such as the one described and shown in FIGS. 3 and 4 that it is possible to provide reliable on-off control. Furthermore, with such a hydraulic control valve it is possible to provide reliable on-off control for high hydraulic pressures and such hydraulic pressures are higher than that normally controlled by conventional solenoid valves. For example, control of oil pressure more than five times that of a conventional solenoid valve (about 10 kg/cm$^2$) can be provided.

Returning to FIG. 2, to the air inlet port 41 of the hydraulic valve 60 is connected a branch pipeline 25. Also, the entrance of the outgoing pipeline 70 is connected to the oil inlet port 39 and the exit of the outgoing pipeline 70 is connected to the oil outlet port 40. On the other hand, the hydraulic valve 61 is similar to the valve 60 in that its air inlet port 41 is connected to the branch pipeline 26. However, hydraulic valve 61 is different from valve 60 in that the entrance of the returning pipeline 71 is connected to the oil inlet port 39 while the exit of the pipeline 71 is connected to the oil outlet port 40. Since the hydraulic valves 140 and 141 are connected in a similar manner, an explanation of their connection is omitted.

In operation, when the air valve 100 is brought to the operating position by using the operating knob 1001, that is when the branch pipeline 230 and the port $a_3$ are adjusted to become in alignment, compressed air from the branch pipeline 230 acts through the pipeline 24 on the air switch 9 to turn on and thereby supply electric power to the motor of the hydraulic pump 4. As a result, oil is sucked up by the pump 4 and is provided to the hydraulic valve 60 via the outgoing pipeline. At the same time, by the introduction of compressed air from the branch pipeline 25, hydraulic valve 60 is opened. As a result, oil enters into the hydraulic cyclinder 11 by way of the hydraulic valve 60 and causes the piston to go up. When the required lift position is reached, by returning the air valve 100 to the non-operating position, air switch 9 is turned off and at the same time hydraulic valve 60 is closed. Accordingly, the hydraulic cylinder 11 stops at this position. In this state, compressed air remaining in the hydraulic valve 60 returns to the air valve 100 through the branch pipeline 25 and is discharged to the open air from the air outlet port $a_4$. Thereafter, the inside of the piston chamber 47 of the hydraulic valve is kept at atmospheric pressure by means of the air vent 46.

Next, when air valve 101 is brought into the operating position, compressed air enters into the hydraulic valve 61 from the pipeline 26 causing the valve port to open and resulting in a connection with the returning pipeline 71. Therefore, oil is returned to the oil tank 7. When the air valve 101 is brought back to the non-operating position, the hydraulic valve 61 is closed and the piston of the hydraulic cylinder stops descending. Also at this time, the returning of air from the hydraulic valve 61 and the maintainence of atmospheric pressure are carried out in the same manner as mentioned above. It is evident from the above, that the lifting and lowering of the seat 2 can be accomplished with this mechanism. It must be understood that, by the completely same mechanism, hydraulic cylinder 12 for backward and forward tilting of the backrest can be accomplished. It should also be apparent that the simultaneous operation of the vertical movement of the seat and the backward and forward tilting of the backrest can be achieved by concurrent operation of the air valves 100, 101, 200 and 201.

As described above, in the present invention, through the combination of air valves, air switches and pneumatic type hydraulic valves, a hydraulic cylinder can be controlled totally without using a relay switch or solenoid valve. Therefore, the low voltage control circuit using a transformer for controlling the relay switch and solenoid valve is not necessary with a resultant reduction in power consumption as well as an elimination of the problem of transformer burn out. In addition, another advantage is that the air source 22 for the present invention can be the one existing in the treatment table or the air source for the handpiece itself. As a result, the present invention reduces costs and provides a reliable control system.

It should be apparent to those skilled in the art that the above described embodiment is merely one of many possible specific embodiments which represent the applications of the principles of the present invention. Numerous and various other arrangements can be readily devised by those skilled in the art without departing from the spirit and scope of the invention.

I claim:

1. A drive control circuit for a dental treatment table with a hydraulic cylinder for elevating and lowering a seat, comprising:

a hydraulic drive circuit equipped with a hydraulic pump, a first hydraulic valve for supplying hydraulic fluid to said cylinder, and a second hydraulic valve for exhausting hydraulic fluid from said hydraulic cylinder, and a hydraulic pump operation circuit equipped with an air switch for turning on said hydraulic pump when said air switch is operated, a first air valve for operating said air switch and said first hydraulic valve, and a second air valve for controlling said second hydraulic valve.

2. A drive control circuit according to claim 1, wherein said first and second hydraulic valves are of a pneumatic type.

3. A drive control circuit according to claim 2, wherein said drive circuit and pump operation circuit are coupled such that (i) said cylinder is elevated, when compressed air is supplied through said air valve to turn on said air switch to drive said hydraulic pump and said first hydraulic valve is opened, (ii) said cylinder is lowered, when compressed air is cut to switch said pump off and shut said first hydraulic valve and said second hydraulic valve is opened, and (iii) said cylinder is stopped, when said second valve is shut.

4. A drive control circuit according to claim 2 or 3, wherein said control circuit further comprises a second cylinder for tilting a backrest connected to said seat.

5. A drive control circuit according to claim 4, wherein said second cylinder is controlled by said hydraulic drive circuit having a set of hydraulic valves for elevating and lowering said second cylinder and said hydraulic pump operation circuit having an air switch and a set of air valves for controlling said hydraulic valves for elevating and lowering said second cylinder.

6. A drive control circuit for a dental treatment table with a hydraulic cylinder for elevating and lowering a seat, comprising:

a hydraulic drive circuit equipped with a hydraulic pump, a first pneumatic type hydraulic valve for supplying hydraulic fluid to said cylinder, and a second pneumatic type hydraulic valve for exhausting hydraulic fluid from said hydraulic cylinder; and a hydraulic pump operation circuit equipped with an air switch for turning on said hydraulic pump when said air switch is operated, a first air valve for operating said air switch and said first hydraulic valve, and a second air valve for controlling said second hydraulic valve;

whereby said cylinder is elevated when compressed air is supplied through said air valve to turn on said air switch to drive said hydraulic pump and said first hydraulic valve is opened, said cylinder is lowered when compressed air is cut to switch said pump off and shuts said first hydraulic valve and said second hydraulic valve is opened and said cylinder is stopped when said second valve is shut.

* * * * *